United States Patent
Terai et al.

(10) Patent No.: US 8,657,950 B2
(45) Date of Patent: Feb. 25, 2014

(54) INORGANIC MATERIAL BOARD

(71) Applicant: Nichiha Corporation, Nagoya (JP)

(72) Inventors: Kenta Terai, Nagoya (JP); Hiromi Fujiwara, Koshigaya (JP)

(73) Assignee: Nichiha Corporation, Nagoya-Shi (JP)

( * ) Notice: Subject to any disclaimer, the term of this patent is extended or adjusted under 35 U.S.C. 154(b) by 0 days.

(21) Appl. No.: 13/792,548

(22) Filed: Mar. 11, 2013

(65) Prior Publication Data

US 2013/0263760 A1     Oct. 10, 2013

(30) Foreign Application Priority Data

Apr. 6, 2012   (JP) ................. 2012-087785

(51) Int. Cl.
| | | |
|---|---|---|
| *C04B 7/153* | (2006.01) | |
| *C04B 16/02* | (2006.01) | |
| *C04B 18/24* | (2006.01) | |
| *C04B 24/10* | (2006.01) | |
| *C04B 28/08* | (2006.01) | |
| *C04B 28/14* | (2006.01) | |

(52) U.S. Cl.
USPC ........... 106/707; 106/780; 106/782; 106/783; 106/790; 106/791; 428/702; 428/703

(58) Field of Classification Search
USPC ................. 106/782, 783, 790, 791, 707, 780; 428/702, 703
See application file for complete search history.

(56) References Cited

U.S. PATENT DOCUMENTS 4,146,402 A * 3/1979 Kira et al. ...................... 106/644
6,605,148 B2 * 8/2003 Shirakawa et al. ........... 106/672

FOREIGN PATENT DOCUMENTS

| JP | 56-37106 A | 4/1981 |
| JP | 59223264 A * | 12/1984 |
| JP | 61072670 A * | 4/1986 |
| JP | 2006206375 A * | 8/2006 |

OTHER PUBLICATIONS

Derwent-Acc-No. 2008-L19484, abstract of Chinese Patent Specification No. CN 101244923 A (Aug. 2008).*
Derwent-Acc-No. 2009-E36846, abstract of Korean Patent Specification No. KR 855122 B1 (Aug. 2008).*

* cited by examiner

*Primary Examiner* — Anthony J Green
(74) *Attorney, Agent, or Firm* — Birch, Stewart, Kolasch & Birch, LLP

(57) ABSTRACT

An inorganic material board, which is a cured mat formed by dehydrating a slurry including 30 to 53 wt % of blast furnace slag, 2 to 5 wt % of gypsum having an average particle size of 200 to 2000 μm, 5 to 11 wt % of alkaline material, 5 to 15 wt % of reinforcing fibers, and 31 to 50 wt % of inorganic admixture with respect to a total solid content, and in which a weight ratio of the blast furnace slag to the gypsum to the alkaline material is 1:0.05 to 0.15:0.15 to 0.35. It is desirable that the blast furnace slag has a specific surface area of 3000 to 5000.

6 Claims, No Drawings

INORGANIC MATERIAL BOARD

BACKGROUND OF THE INVENTION

1. Field of the Invention

The present invention relates to an inorganic material board which is suitable as a building board.

2. Description of the Related Art

Conventionally, as described in Japanese Patent Application Publication No. S56-37106, an inorganic material board is manufactured by dehydrating a slurry of cement, fiber material, and the like, suspended in water to form a mat, and curing and hardening this mat. The inorganic material board of this kind has excellent properties, such as bending strength, and is therefore used as a building board for inner walls and outer walls of houses.

However, in recent years, amid growing concerns about environmental problems, companies have been making efforts to suppress carbon dioxide emissions and use industrial waste products efficiently. One of these efforts includes the change of the raw materials with materials which produce less carbon dioxide in the manufacturing process.

For example, the manufacturing process for cement produces a large amount of carbon dioxide, and therefore from the viewpoint of environmental problems, cement is not a desirable raw material. However, conventional inorganic material boards have contained 50 to 75 wt % of cement, as described in Japanese Patent Application Publication No. S56-37106. Therefore, investigation has been carried out into changing from cement to blast furnace slag which produces less carbon dioxide during manufacture, or reducing the combination ratio of cement, in the manufacture of building board. Furthermore, as the raw materials the use of industrial waste products and by-products, such as coal ash or plasterboard waste, are being examined.

However, if the cement is changed to blast furnace slag, or the combination ratio of cement is reduced and the combination ratio of industrial waste products and by-products is increased, then the properties such as the bending strength of the manufactured inorganic material board are reduced and there is a risk that the board cannot be used as a building board.

SUMMARY OF THE INVENTION

Therefore, it is an object of the present invention to provide an inorganic material board suitable for a building board, in which the content of cement is restricted to 0 to 11 wt %, in consideration of environmental concerns, and a large amount of waste material and by-products are used.

The present invention provides an inorganic material board which is suitable as a building board. The inorganic material board is a cured mat formed by dehydrating a slurry including 30 to 53 wt % of blast furnace slag, 2 to 5 wt % of gypsum having an average particle size of 200 to 2000 μm, 5 to 11 wt % of alkaline material, 5 to 15 wt % of reinforcing fibers, and 31 to 50 wt % of inorganic admixture with respect to a total solid content, in which a weight ratio of the blast furnace slag to gypsum to alkaline material is 1:0.05 to 0.15:0.15 to 0.35. The blast furnace slag is generated as a by-product when making pig iron in a steel-making blast furnace of a steelworks, and according to the inorganic material board of the present invention, the content of cement is suppressed and industrial waste products is used effectively. Furthermore, if the blast furnace slag has a specific surface area of 3000 to 5000, then the required properties can be guaranteed, as well as further suppressing production of carbon dioxide during manufacture of the raw materials, which is desirable. Here, the specific surface area is a value measured by a test method stipulated in JIS A 6206.

Furthermore, if the inorganic material board according to the present invention has a bending strength of no less than 10 N/mm$^2$, the board is suitable to as an outer wall material, which is desirable. Furthermore, the cured layer comprising blast furnace slag, gypsum, alkaline material, reinforcing fibers, and inorganic admixture may be a single layer or multiple layers.

Moreover, if the furnace slag is granulated blast furnace slag, the gypsum is recycled gypsum obtained by crushing plasterboard waste, either coal ash or papermaking sludge incineration ash is included as inorganic admixture, and wastepaper is included as reinforcing fibers, then industrial waste products are used effectively, which is desirable. If the total of the granulated blast furnace slag, the recycled gypsum, the coal ash, the papermaking sludge incineration ash and the wastepaper is 50 to 95 wt % with respect to a total solid content, then the effective use of the industrial waste products is further promoted, which is desirable.

According to the present invention, it is possible to provide an inorganic material board suitable for a building board, in which the content of cement is restricted to 0 to 11 wt %, in consideration of environmental concerns, and a large amount of waste material and by-products are used.

DESCRIPTION OF THE PREFERRED EMBODIMENTS

Below, an embodiment of the present invention is described in concrete terms.

The inorganic material board according to the present invention is constituted by blast furnace slag, gypsum, alkaline material, reinforcing fibers, and an inorganic admixture.

The blast furnace slag is produced as a by-product when manufacturing pig iron in a steel-making blast furnace. Blast furnace slag includes: rock-like slow-cooled blast furnace slag which is a crystalline material obtained by causing molten slag to flow into a cooling yard and applying a progressive cooling process by natural cooling and suitable water sprinkling, and particulate granulated blast furnace slag which is a glass material obtained by applying a rapid cooling process to molten slag, for instance, by spraying pressurized water. It is possible to include either one of these types of slag only, or both types of slag. The blast furnace slag desirably has a specific surface area (as specified according to JIS A 6206) of 3000 to 5000. If the specific surface area of the blast furnace slag is less than 3000 according to JIS A 6206, then the bending strength of the obtained inorganic material board is weak, and if the specific surface area is greater than 5000, then energy is required to crush the slag, leading to increased production of carbon dioxide, which is not desirable from an environmental perspective. The blast furnace slag does not have to be a JIS product and it is also possible to use a non-JIS product.

For the gypsum, it is possible to use anhydrous gypsum, hemihydrate gypsum, dehydrate gypsum, or the like, and of these materials, it is possible to use either only one type of material, or two or more types of material, but an average particle size of 200 to 2000 μm is essential. If the average particle size of the gypsum is less than 200 μm, then when the slurry is dehydrated over felt, the gypsum passes through the felt with the water and cannot be retained sufficiently on the felt, and if the average particle size is larger than 2000 μm, then the bending strength of the obtained inorganic material board is weak. In recent years, the processing of plasterboard waste material has become an environmental problem, and recycling thereof has become desirable. Therefore, it is desirable to use recycled gypsum obtained by crushing plasterboard waste material.

For the alkaline material, it is possible to include at least one of, or two or more of: cement, slaked lime, quick line, sodium hydroxide, potassium hydroxide, sodium aluminate, potassium aluminate, water glass, and the like. The alkaline material serves to start reaction of the slag and gypsum.

For the reinforcing fibers, it is possible to use anyone of, or two or more of: wood reinforcing fibers, such as wood chips, bamboo chips, wood dust, wastepaper, needle unbleached kraft pulp (NUKP), needle bleached kraft pulp (NBKP), laubholz unbleached kraft pulp (LUKP), laubholz bleached kraft pulp (LBKP), or the like, or synthetic fibers, such as polyester fibers, polyamide fibers, acrylic fibers, polyvinylidene chloride fibers, acetate fibers, polypropylene fibers, polyethylene fibers, vinylone fibers, and the like, or glass fibers, carbon fibers, ceramic fibers, rock wool, or the like. In consideration of environmental problems, it is possible to use wastepaper which is a recycled product.

As the inorganic admixture material, it is possible to use only one, or two or more of the following materials: coal ash, papermaking sludge incineration ash, pearlite, silica fume, mica, calcium carbonate, magnesium hydroxide, aluminum hydroxide, wollastonite, vermiculite, sepiolite, xonotlite, and the like. Coal ash and papermaking sludge incineration ash are industrial waste products, and in consideration of environmental problems, it is desirable to include coal ash and papermaking sludge incineration ash.

It is also possible to use inorganic component material. The inorganic component material may be defective boards of inorganic material board before curing, or defective boards of inorganic material board after curing, which occur during the manufacturing process, or chips, scraps and the like of inorganic material boards which occur at a construction site. In either case, the material is used by being crushed in an impact crushing machine and/or a rubbing crushing machine. By using this inorganic component material, it is possible to reduce industrial waste products, which is desirable when environmental problems are taken into consideration.

Moreover, it is also possible to use a silica sand, silica flour, silica powder, diatomaceous earth, kaolinite, zeolite, a curing promoter, such as calcium chloride, magnesium chloride, potassium sulphate, calcium sulphate, magnesium sulphate, aluminum sulphate, calcium formate, calcium acetate, calcium acrylate, or the like, or a mineral powder such as bentonite, a waterproofing agent or water-repelling agent such as a metal salt of high fatty acid, paraffin, silicon, succinic acid, wax, foaming thermoplastic beads, or plastic foam, an aqueous starch, such as polyvinyl alcohol or carboxymethyl cellulose, or a composite resin emulsion strengthener, such as styrene-butadiene latex or acrylic resin emulsion.

The inorganic material board according to the present invention is manufactured by creating a slurry including 30 to 53 wt % of blast furnace slag, 2 to 5 wt % of gypsum, 5 to 11 wt % of alkaline material, 5 to 15 wt % of reinforcing fibers, and 31 to 50 wt % of inorganic admixture with respect to a total solid content, in which the weight ratio of the blast furnace slag to the gypsum to the alkaline material is 1:0.05 to 0.15:0.15 to 0.35, dehydrating the slurry, and curing and hardening the mat thus formed. The gypsum is set to 2 to 5 wt % because if the weight ratio is less than 2 wt %, the strength of the obtained inorganic material board is too weak, and if the weight ratio is greater than 5 wt %, then the properties such as the rate of dimensional change deteriorate. The alkaline material is set to 5 to 11 wt % because if the weight ratio is less than 5 wt %, the reaction between the blast furnace slag and the gypsum is insufficient and the strength of the obtained inorganic material board is insufficient, whereas if the weight ratio is greater than 11 wt %, then this is not desirable from an environmental perspective. The reinforcing fibers are set to 5 to 15 wt % because if the weight ratio is less than 5 wt %, then the strength of the obtained inorganic material board is insufficient, and if the weight ratio is greater than 15 wt %, then hardening is insufficient, chemicals are required in order to improve this, and hence the environmental burden becomes larger, which is not desirable. The inorganic admixture is set to 31 to 50 wt % because, if this weight ratio is less than 31 wt %, then the promotion of use of industrial waste products and by-products is insufficient, whereas if this weight ratio is greater than 50 wt %, then there are concerns that the strength of the obtained inorganic material board will be insufficient. Furthermore, by including the blast furnace slag, the gypsum and the alkaline material in a weight ratio of 1:0.05 to 0.15:0.15 to 0.35, the inorganic material board obtained is able to have sufficient strength, while also having a small rate of dimensional change.

If the inorganic material board according to the present invention has a bending strength of no less than 10 N/mm$^2$, the board is suitable as an outer wall material, which is desirable. Furthermore, the cured layer comprising blast furnace slag, gypsum, alkaline material, reinforcing fibers and inorganic admixture may be a single layer or multiple layers.

If the blast furnace slag is granulated blast furnace slag, the gypsum is recycled gypsum obtained by crushing plasterboard waste, either coal ash or papermaking sludge incineration ash is included as inorganic admixture, and wastepaper is included as reinforcing fibers, then industrial waste products are used efficiently, which is desirable. If the total of the granulated blast furnace slag, the recycled gypsum, the coal ash, the papermaking sludge incineration ash and the wastepaper with respect to a total solid content is 50 to 95 wt %, then the efficient use of the industrial waste products is further promoted, which is desirable.

The inorganic material board according to the present invention is manufactured by dehydrating a slurry comprising blast furnace slag, gypsum, alkaline material, reinforcing fibers and inorganic admixture, to form a mat, and then hardening the mat.

The slurry includes blast furnace slag, gypsum, alkaline material, reinforcing fibers, and an inorganic admixture. The blast furnace slag, gypsum, alkaline material, reinforcing fibers and inorganic admixture may be mixed in a powder (dry) state and then dispersed in water to form a slurry, or alternatively, each of the starting materials maybe dispersed beforehand in water, separately, and then mixed together to form a slurry.

The slurry is dehydrated by a sheet making method or molding method, to form a mat.

In a sheet making method, a mat is formed by separating the slurry into water and solid components, by using a felt, or a mesh, or the like. More specifically, it is also possible to adopt a method which dehydrates the slurry by causing the slurry to flow down through a felt, or a method which dehydrates the slurry by passing it through a mesh drum. The obtained green sheet may also have a further green sheet layered thereon, to form a laminated mat. As the lamination method, it is possible to adopt a method in which a plurality of apparatuses that manufacture green sheets are prepared in the conveyance direction of the green sheets, and green sheets manufactured by the respective apparatuses are laminated together, or a method in which green sheet is wound on a roll and laminated, and upon obtaining a prescribed thickness, leaves the roll. In a sheet making method, the solid concentration of the slurry before dehydration is adjusted so as to be no more than 20 wt %. The solid concentration of the slurry is set to no more than 20 wt % because if the solid concentration is greater than 20 wt %, it takes time to dehydrate the slurry, cracks are liable to occur in the dehydrated green sheet, and a problem occurs in that sheet making is hard to perform, and so on.

In a molding method, the slurry is poured into a frame having a suction dehydrating machine on the lower side, suction dehydration is carried out from the lower side, and a mat is formed by separating the slurry into water and solid components. In the molding method, the solid concentration of the slurry before dehydration is adjusted so as to be 20 to 40 wt %. The solid concentration of the slurry is set to no less than 20 wt % because if the solid concentration is less than 20 wt %, it takes time to dehydrate the slurry, and a problem occurs in that cracks are liable to occur in the dehydrated mat, and so on. The solid concentration of the slurry is set to no more than 40 wt % because if the solid concentration is more than 40 wt %, the fluidity of the slurry deteriorates, and a problem occurs in that cracks are liable to occur in the dehydrated mat, and so on.

The obtained mat is normally pressed at a pressure of no less than 10 kg/cm$^2$, and then cured by natural curing, steam curing, or heated curing, such as autoclave curing, or the like. During pressing, it is possible to form a convex-concave pattern on a surface of the mat by arranging a mold sheet above or below the mat. Furthermore, steam curing is normally carried out at 60 to 90° C. for 5 to 36 hours, and autoclave curing is normally carried out for 7 to 15 hours at 170 to 200° C. and at a pressure of no less than 0.5 MPa. Furthermore, it is also possible to carry out primary curing before heated curing.

Next, Examples of the present invention are given.

Inorganic material boards according to Examples 1 to 5 and Comparative Examples 1 to 3 were manufactured by passing slurry having the solid composition shown in Table 1 down over felt, to dehydrate the slurry and obtain a sheet, layering the obtained sheets to form a mat, and carrying out steam curing at 80° C. The solid concentration in the slurry was 14 wt % in all cases, and the mat was pressed at 20 kg/cm$^2$ to obtain a board thickness of 14 mm.

In each of the inorganic material boards obtained in the Examples 1 to 5 and the Comparative Examples 1 to 3, the specific weight, bending strength, deflection and rate of dimensional change after 7 days' immersion in water were measured, and the results of these measurements are shown in Table 1. The bending strength and deflection were measured in accordance with JIS A 1408, except for the fact that a 7×20 cm test piece was used. The rate of dimensional change after 7 days' immersion in water was found by measuring the length of the test piece. (called $l_3$) after setting the test piece to a state of equilibrium in a constant-temperature and constant-humidity chamber at 20° C. and 65% humidity, and then immersing the test piece in water and after 7 days had passed, removing the test piece from the water, removing the water adhering to the surface of the test piece with a cloth, and measuring the length of the test piece (called $l_4$) again, the value of the rate of dimensional change being determined by dividing ($l_4-l_3$) by $l_3$ and multiplying by 100.

TABLE 1

| | | | Example 1 | Example 2 | Example 3 | Example 4 | Example 5 | Comparative Example 1 | Comparative Example 2 | Comparative Example 3 |
|---|---|---|---|---|---|---|---|---|---|---|
| Ratio of slurry (solid content) | Blast furnace slag (specific surface area* 3000) | wt % | 30.0% | 53.0% | 45.0% | 0.0% | 32.0% | 45.0% | 25.0% | 45.0% |
| | Blast furnace slag (specific surface area* 5000) | wt % | 0.0% | 0.0% | 0.0% | 45.0% | 0.0% | 0.0% | 0.0% | 0.0% |
| | Portland cement | wt % | 0.0% | 0.0% | 10.0% | 10.0% | 0.0% | 10.0% | 0.0% | 3.0% |
| | Slaked lime | wt % | 5.0% | 8.0% | 0.0% | 0.0% | 11.0% | 0.0% | 10.0% | 0.0% |
| | Recycled gypsum (1500 μm) | wt % | 2.0% | 3.0% | 4.0% | 4.0% | 4.8% | 0.0% | 3.0% | 7.0% |
| | Recycled gypsum (4000 μm) | wt % | 0.0% | 0.0% | 0.0% | 0.0% | 0.0% | 4.0% | 0.0% | 0.0% |
| | Fly ash (Coal ash) | wt % | 25.0% | 20.0% | 15.0% | 15.0% | 22.2% | 15.0% | 22.0% | 10.0% |
| | Papermaking sludge incineration ash | wt % | 20.0% | 10.0% | 10.0% | 10.0% | 15.0% | 10.0% | 22.0% | 10.0% |
| | Pearlite | wt % | 5.0% | 1.0% | 9.0% | 9.0% | 0.0% | 9.0% | 8.0% | 5.0% |
| | Wastepaper | wt % | 7.0% | 2.0% | 5.0% | 5.0% | 10.0% | 5.0% | 7.0% | 10.0% |
| | NUKP | wt % | 6.0% | 3.0% | 2.0% | 2.0% | 5.0% | 2.0% | 3.0% | 10.0% |
| | Subtotal | wt % | 100.0% | 100.0% | 100.0% | 100.0% | 100.0% | 100.0% | 100.0% | 100.0% |
| Properties | Specific weight | — | 0.95 | 1.05 | 1.01 | 1.02 | 0.98 | 0.99 | 0.94 | 0.95 |
| | Bending strength | N/mm$^2$ | 10.2 | 11.5 | 11.9 | 12.2 | 10.9 | 9.7 | 8.5 | 9.1 |
| | Deflection | % | 13 | 12 | 15 | 13 | 15 | 15 | 15 | 17 |
| | Rate of dimensional change after 7 days' immersion in water | % | 0.20 | 0.17 | 0.21 | 0.22 | 0.24 | 0.22 | 0.26 | 0.30 |

*Specific surface area in accordance with JIS A 6206.

The inorganic material board according to Comparative Example 1 which was manufactured from slurry containing recycled gypsum having an average particle size of 4000 μm had a bending strength lower than 10 N/mm$^2$, which was an inferior bending strength. Furthermore, the inorganic material board according to Comparative Example 2 which was manufactured using slurry in which the relative solid content of the blast furnace slag was less than 30 wt %, the weight ratio of the blast furnace slag to alkaline material was greater than 1:0.35, and the relative solid content of the inorganic admixture was greater than 50 wt %, had a bending strength significantly lower than the 10 N/mm$^2$, which was an inferior bending strength, and showed a high rate of dimensional change after 7 days' immersion in water. Moreover, the inorganic material board according to Comparative Example 3, manufactured using slurry, in which contents of the alkaline material and inorganic admixture relative to solid were less than 5 wt % and 31 wt % respectively, the weight ratio of blast furnace slag to gypsum was greater than 1:0.15, the weight ratio of blast furnace slag to alkaline material was smaller than 1:0.15 and the solid contents of gypsum and reinforcing fibers relative to total solid were 5 wt % and 15 wt % respectively, had a bending strength lower than 10 N/mm$^2$, which was an inferior bending strength, and showed a high rate of dimensional change after 7 days' immersion in water was high.

On the other hand, the inorganic material boards according to Examples 1 to 5 each had a bending strength greater than 10 N/mm$^2$, showed little rate of dimensional change after 7 days' immersion in water, and were suitable as outer wall material.

One embodiment of the present invention was described above, but the present invention is not limited to this and various modifications can be made within the scope of the invention as described in the claims.

As described above, according to the present invention, it is possible to provide an inorganic material board suitable for a building board, in which the content of cement is restricted to 0 to 11 wt %, in consideration of environmental concerns, and a large amount of waste material and by-products are used.

What is claimed is:

1. An inorganic material board, which is a cured mat formed by dehydrating a slurry including 30 to 53 wt % of blast furnace slag, 2 to 5 wt % of gypsum having an average particle size of 200 to 2000 μm, 5 to 11 wt % of alkaline material, 5 to 15 wt % of reinforcing fibers, and 31 to 50 wt % of inorganic admixture with respect to a total solid content, and in which a weight ratio of the blast furnace slag to the gypsum to the alkaline material is 1:0.05 to 0.15:0.15 to 0.35, wherein the blast furnace slag is granulated blast furnace slag,
the gypsum is recycled gypsum obtained by crushing plasterboard waste,
the inorganic material board contains one or more component selected from the group consisting of coal ash and papermaking sludge incineration ash, as the inorganic admixture, and
the inorganic material board contains wastepaper as the reinforcing fibers.

2. The inorganic material board according to claim 1, wherein the blast furnace slag has a specific surface area of 3000 to 5000.

3. The inorganic material board according to claim 1, wherein a bending strength is not less than 10 N/m$^2$.

4. The inorganic material board according to claim 1, wherein a total amount of the granulated blast furnace slag, the recycled gypsum, the coal ash, the papermaking sludge incineration ash and the wastepaper is 50 to 95 wt % with respect to total solid content.

5. The inorganic material board according to claim 1, wherein cured layers formed of the blast furnace slag, the gypsum, the alkaline material, the reinforcing fibers and the inorganic admixture are laminated so that the inorganic material board is formed.

6. The inorganic material board according to claim 1, containing, as the alkaline material, one or more component selected from the group consisting of cement, slaked lime, quick lime, sodium hydroxide, potassium hydroxide, sodium aluminate, potassium aluminate, and water glass.

* * * * *